United States Patent [19]

Kawai

[11] Patent Number: 5,067,354
[45] Date of Patent: Nov. 26, 1991

[54] TORQUE TRANSDUCER AND TORQUE MEASURING DEVICE

[75] Inventor: Masayasu Kawai, Tokyo, Japan

[73] Assignee: Kyowa Electronic Instruments Co., Ltd., Tokyo, Japan

[21] Appl. No.: 356,789

[22] Filed: May 24, 1989

[30] Foreign Application Priority Data

May 31, 1988 [JP] Japan .................................. 63-131467

[51] Int. Cl.$^5$ .............................................. G01L 3/12
[52] U.S. Cl. .................................................. 73/862.34
[58] Field of Search ........................ 73/862.33, 862.34; 250/231 SE, 237 G

[56] References Cited

FOREIGN PATENT DOCUMENTS 0076928 4/1986 Japan ................................. 73/862.34
1470167 4/1977 United Kingdom ............. 73/862.34

Primary Examiner—Charles A. Ruehl
Attorney, Agent, or Firm—McAulay Fisher Nissen Goldberg & Kiel

[57] ABSTRACT

Phase differences generated between respective pairs of rotating members and stationary members mounted on the drive side and load side of a torque transmission shaft are converted into relative opening amounts produced by slits formed in the above pairs of rotating members and stationary members, respectively, and the opening amounts are detected by two opening amount transducers and converted into electric signals. The torque transmitted to the torque transmission shaft is measured by detecting relative phase differences between both rotating members from periodic changes in the outputs from these two opening amount transducers.

15 Claims, 9 Drawing Sheets

TORQUE TRANSDUCER AND TORQUE MEASURING DEVICE

BACKGROUND OF THE INVENTION

1) Field of the Invention

The present invention relates to a torque transducer and a torque measuring device, and more particularly to a torque transducer for detecting a torque transmitted (loaded) to a torque transmission shaft based on a phase difference between pairs of rotating members and stationary members mounted on the drive side and load side of the torque transmission shaft, respectively, and a torque measuring device for measuring a torque transmitted to the torque transmission shaft, in accordance with an output of the above torque transducer.

2) Description of the Prior Art

It is well known to provide a torque measuring device for measuring a torque between a load side and a drive side of a torque transmission shaft connected to a prime mover such as a motor or engine, by detecting a torsion (shear strain) at a torque transmission shaft or torque detector shaft connected between the load side and the drive side of the torque transmission shaft.

The conventional torque measuring device, however, has a drawback in that the object to be measured is rotated, and the measured data is transmitted to a stationary device by a telemeter or slip ring, and therefore, the detection accuracy is low due to noise caused by the rotational contact of the slip ring or noise introduced from other sources.

To overcome the above drawback, there has been proposed a device for measuring the above torque by a non-contact process in which a relative phase difference between both rotating disks secured on the load side and drive side of the torque transmission shaft, respectively, is detected. For example, as shown in FIG. 10 illustrating the drive side of a torque detector shaft, a rotating disk 73 is coaxially fixed to a flange 72 mounted on the drive side 71a of the torque detector shaft 71, and a stationary disk 74 is fixedly and coaxially arranged in a position adjacent to the rotating disk 73. A plurality of elongated slits 74a, 73a are provided radially at equidistant intervals in the outer circumferential parts of the stationary disk 74 and the rotating disk 73, and a light receiver 75 is arranged in such a manner that it receives a light transmitted through the two slits 73a and 74a from a light projector 76. The same assembly as above is provided on the load side, i.e., at the left side of the torque detector shaft 71 (not shown), and the slits 73a in the rotating disks 73 on both the load side and the drive side 71a are aligned with each other and the slits 74a of the stationary disks 74 on both the load side and the drive side 71a are also aligned with each other, (any misalignment between these slits must be allowed for by incorporating the amount of deviation in the result of the measurements). Upon rotation of the torque detector shaft 71, the rotating disk 73 is also rotated, and due to the alignment of the slits 73a and 74a, the light from the light projector 76 is transmitted through the slits 73a and 74a and received by the light receiver 75. During the rotation of the disk 73, the opening formed between the slit 73a and 74a is first opened by a small amount, is then fully opened, again becomes a small opening, and finally, is fully closed. Accordingly, as the rotating disk 73 is rotated, the amount of light received by the light receiver 75 repeats a cycle of (zero)→(small)→(large)→(maximum)→(large)→(small)→(zero). When the widths of the slits 73a and 74a in the circumferential direction are suitably set, the above cycle produces a sine curve, and therefore, the light receiver 75 outputs a signal having approximately a sine curve. Therefore, the degree of torsion at the torque detector shaft 71 can be detected by comparing the phase of the sine curve signal obtained at the drive side 71a with the phase of the signal obtained at the load side. Namely, if the torsion is zero, the relative difference in the phase of the above signals is also zero.

Nevertheless, upon starting and stopping, the rotation of the torque detector shaft 71, since only the drive side 71a is driven and the load side is not rotated, the rotating disk 73 of the drive side 71 and the rotating disk of the load side are not both rotated, and therefore, the above sine curve signal can not be obtained, i.e., the torque can not be measured. To overcome the above drawback, a countermeasure has been considered whereby, when the speed of rotation of the torque detector shaft 71 becomes less than a predetermined value, the stationary disk 74 is rotated by a predetermined amount by a drive force other than that of the drive side 71a. This, however, leads to other problems in that the constitution of the device and the necessary adjustments become complex.

SUMMARY OF THE INVENTION

The present invention has been made in consideration of the problems described above, and therefore, a primary object of the present invention is to provide a torque transducer and torque measuring device having a very simple construction and capable of detecting and measuring a torque correctly and easily, without contact with a torque transmission shaft and without using a heat-causing member such as a slip-ring, by using a rotating disk integratedly rotated with the torque transmission shaft, whereby a precise measurement is obtained not only during a normal speed of rotation but also during a low speed rotation of the disk or when the disk is not rotated.

Therefore, according to the present invention, there is provided a torque transducer which comprises a drive side rotating member and load side rotating member mounted on the drive side and load side of the torque transmission shaft, respectively, and formed as flat plates or cylindrical bodies provided with first slits each having a similar shape, a drive side stationary member and load side stationary member fixedly mounted on a stationary part adjacent to the drive side rotating member and load side rotating member and formed as flat plates or cylindrical bodies provided with second slits each having a similar shape, and a drive side opening amount detector and load side opening amount detector for detecting a relative amount of an opening formed by the first slit and the second slit on the drive side and a relative amount of an opening formed by the first slit and the second slit on the load side, respectively, and for converting these opening amounts into electric signals to thereby detect a torque transmitted to the torque transmission shaft by detecting a relative phase difference between both rotating members based on periodic changes in the output received from both opening amount detectors, wherein the torque transducer is characterized in that one of the first and second slits has a sector shape or rectangular shape formed by dividing a space between two concentric circles having different radii, or a space between circular bands having a predetermined width, into equal divisions at predetermined angular intervals, and a plurality of the sector slits or rectangular slits are formed on each flat plate or cylindrical body at the above predetermined angular intervals, and the other of the first and second slits has a sector shape or rectangular shape formed by dividing the space between two concentric circles having different radii, or a space between circular bands having a predetermined width, into equal divisions at intervals having an angle different from the above predetermined angle, and a plurality of the sector slits or rectangular slits are formed on the flat plate or cylindrical body at equal intervals having an angle different from the above predetermined angle, and further, a plurality of the drive side opening amount detector and load side opening amount detector are arranged along the circumferential direction at equiangular intervals and facing the second slits formed in the stationary members at the drive side and at the load side, to obtain a periodic change such that the above relative opening amount is formed at an arbitrary time by the first slit and second slit on the drive side and the first slit and second slit on the load side, respectively, and this opening amount is sequentially increased and decreased repeatedly over at least one cycle.

The present invention is further characterized in that one of the first and second slits is formed into a sector or rectangular shape by dividing the space between two concentric circles having different radii, or a space between circular bands with a predetermined width, into equal divisions at predetermined angular intervals, and a plurality of the sector slits or rectangular slits are formed on each flat plate or cylindrical body at predetermined angular intervals, and further, the other of the first and second slits is formed into a sector or rectangular shape similar to that of the above-mentioned slits, and a plurality of the sector slits or rectangular slits are formed on the flat plate or cylindrical body at intervals having irregular angles in such a way that the amount of deviation from the above plurality of slits on one side is sequentially increased or decreased over at least one cycle.

The present invention is also characterized in that there is provided a torque transducer which is composed of first and second opening signal group generating units including a plurality of the drive side opening amount detectors and the load side opening amount detectors, respectively, which are disposed in a plurality of predetermined positions and facing the second slits formed in the stationary members at the drive side and at the load side, to obtain a periodic change of the relative opening amount formed at an arbitrary time by the first slit and second slit on the drive side, and the first slit and second slit on the load side, respectively, for obtaining an opening signal group of the periodic signals during the above at least one cycle, two pairs of memory circuits for similtuaneously receiving two opening signal groups from the first and second opening signal group generating units respectively and temporarily memorizing the signal groups received therefrom, two signal switching circuits for receiving two pairs of respective memory outputs, one pair by one pair, from the above two pairs of memory circuits and sequentially switching one of the plurality of memory outputs in a predetermined order and at predetermined intervals, two interpolation circuits for receiving sampled outputs from the two signal switching circuits, respectively, and interpolating and smoothing the sampled outputs, namely, analog signals received in time series, a phase comparision circuit for receiving the outputs from the two interpolation circuits and detecting and outputting the phase difference between two signals, and a torque amount conversion circuit for receiving the output from the phase comparision circuit and converting the phase difference into the torque, to thereby measure a torque at an arbitrary point even when one or both of the drive side rotating member and the load side rotating member are not rotating.

As mentioned above, according to the present invention, a torque transducer with a low cost and simple construction can be obtained, without using a slip ring causing heat or a high cost telemeter or the like, whereby the detecting signal is obtained from the opening amount detectors disposed on a stationary part, without a deterioration of the detection accuracy due to heat generation, rotational contact noise, and introduced noise, and the torque is detected accurately and easily, without rotating the stationary plate as in conventional manner, by using a rotating member rotated together with the torque transmission shaft, whereby a precise measurement is obtained not only during a normal speed of rotation but also during a low speed of rotation of the disk or when the disk is not rotated. Namely, a torque measuring device is provided which is capable of measuring a torque accurately and easily, using the torque transducer having the above characteristic, whether the torque transmission shaft is rotating or not rotating.

BRIEF DESCRIPTION OF THE DRAWINGS

The present invention will be now described in detail by way of embodiments thereof with reference to the accompanying drawings, wherein.

DESCRIPTION OF THE PREFERRED EMBODIMENTS

Figure 1:
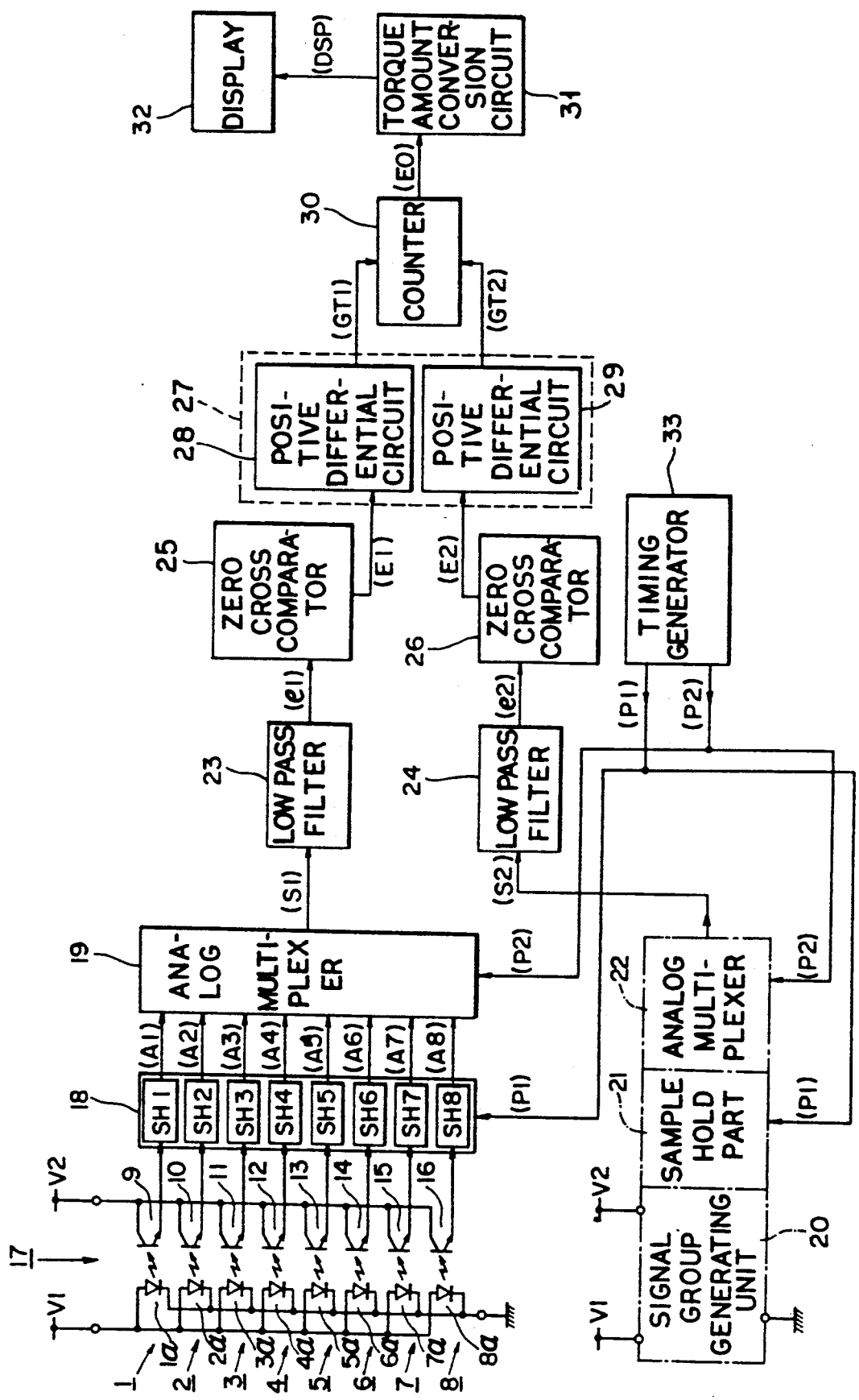
FIG. 1 is a block diagram illustrating the entire construction of a torque measuring device according to the present invention.

The embodiments of the present invention will be described with reference to the accompanying drawings:

FIG. 1 is a block diagram illustrating the entire construction of a torque measuring device according to the present invention.

Referring to FIG. 1, there is provided a first opening signal group generating unit 17 composed of photosensors 1 to 8 serving as opening amount detectors on a torque transmission shaft at, for example, the drive side thereof (described in detail hereinafter), respectively. The photosensors 1 to 8 are composed of respective light emitting diodes 1a to 8a in which the anodes are connected in parallel to a power supply V1 and the cathodes are earthed, and phototransistors 9 to 16, the collectors of which are connected to a power supply V2 to receive light from the light emitting diodes 1a to 8a, respectively, in a one-to-one relationship, and the emitters of which output signals corresponding to the relative openings (described hereinafter), to a sample hold part 18, which comprises eight sample hold circuits SH1 to SH8 to which the emitters of the above phototransistors 9 to 16 are connected at the analog input ends thereof, respectively, and which serves as a memory circuit for receiving held pulses (P1) at the digital input ends thereof, respectively.

An analog multiplexer 19 (hereinafter referred to as MPX) serves as a signal switching circuit and receives held energy signals A1 to A8 held in the sample hold circuits SH1 to SH8, selects one of these signals, sequentially changes the above selection in a predetermined order based on the timing of a sampling pulse (P2), and outputs the selected sample signal (S1) as a sampling output.

A second opening signal group generating unit 20 is disposed on the load side (described in detail hereinafter) and has substantially the same construction as that of the first opening signal group generating unit 17; 21 is a sample hold part having substantially the same construction as that of the sample hold part 18 and receiving signals from the second opening signal group generating unit 20; and 22 is an MPX having substantially the same construction as that of the MPX 19 and outputting a sample signal (S2).

Low pass filters 23, 24 (hereinafter referred to LPF) serves as interpolation circuits, and receive sample signals (S1) and (S2) as analog signals in a time series, respectively, and interpolate these analog siganls on a time axis to output interpolation signals (e1), (e2) having a smooth wave shape; 25, 26 are zero-cross comparators (hereinafter referred to CMP) using Schmidt trigger circuits or the like, which receive the interpolation signals (e1), (e2), respectively, and output phase signals (E1), (E2) which are made H level or L level when the interpolation signals (e1), (e2) exceed 0 V in the positive direction or in the negative direction, respectively.

A phase comparision circuit 27 comprises positive proceeding logic differential circuits 28 and 29 (hereinafter referred to "positive differential circuits"), and receives the phase signals (E1), (E2), respectively, and detects the rising edges of the phase signals (E1), to output trigger signals (GT1) and (GT2) corresponding to the phase difference between the signals (E1), (E2); 30 is a counter for receiving the trigger signals (GT1), (GT2) and outputting a count pulse (EO) correspondng to the above phase difference; 31 is a torque amount conversion circuit for receiving the count pulse (EO) and converting it into an amount of torque; 32 is a display for receiving a display signal (DSP) from the torque amount conversion circuit 31 and displaying the amount of torque; and 33 is a timing generator for generating the held pulse (P1) and sampling pulse (P2). Note, the timing generator 33 also outputs the switching address between the MPXs 19 and 22, but this is not shown in the drawing.

Figure 2:
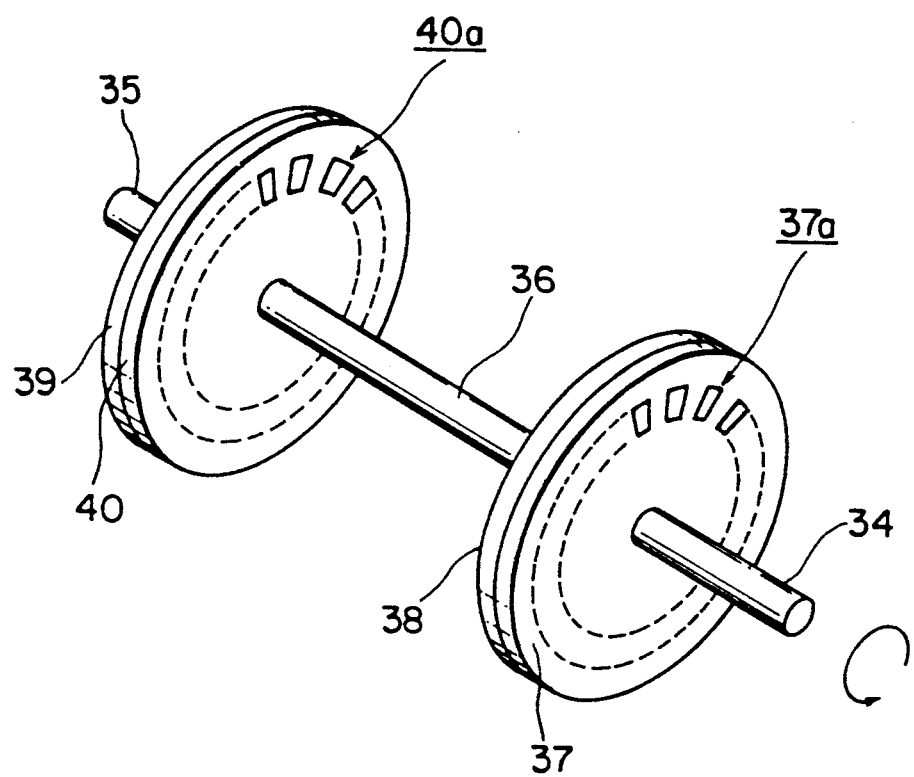
FIG. 2 is a perspective diagram illustrating the entire construction of a torque transducer used in the embodiment shown in FIG. 1.

FIG. 2 is a conceptual perspective view of the construction of a torque transducer according to the present invention, which is a part of the construction of the embodiment shown in FIG. 1.

Referring to FIG. 2, 34 is a drive side of a transmission shaft connected to a motor or prime mover (hereinafter referred to "drive shaft") and 35 is a load side thereof connected to a load (hereinafter referred to "load side"); 36 is a torque detector shaft acting as a torque transmission shaft and connecting the drive side 34 to the load side 35; 37 is a rotor acting as a rotating member and comprises a flat plate rotatably secured to the drive shaft, and provided with a plurality of slits (first slits) 37a formed in a concentric circle therein; 38 is a stator acting as a stationary member comprising a flat plate fixed to a stationary part and arranged coaxially and adjacent to the rotor 37; 39 is a rotor acting as a rotating member on the load shaft side; 40 is a stator provided with a plurality of slits 40a (second slits) having a shape different from that of the slits 37a (first slits). The rotor 39 and stator 38 are also provided with slits (which are not specifically shown in the drawing) having the same shape as the slits 37a and 40a, respectively.

In the following drawings, parts previously described in FIGS. 1 and 2 are denoted by the same symbols and a description thereof is omitted.

Figure 3:
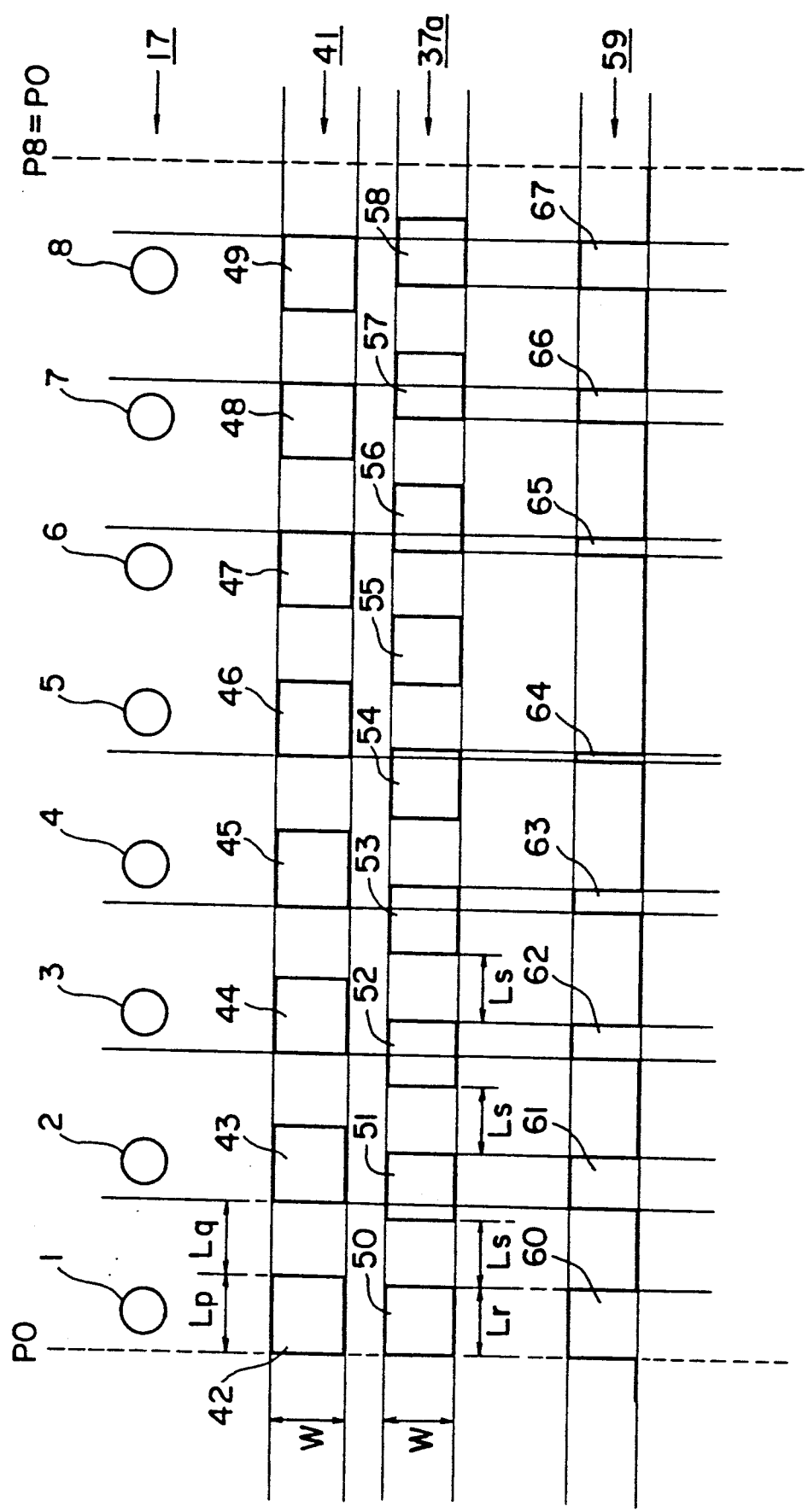
FIGS. 3 and FIG. 4 are an exemplary diagram and a front view illustrating the constructions of the first and second slits which are major members of the torque transducers shown in FIG. 2, respectively.
Figure 4:
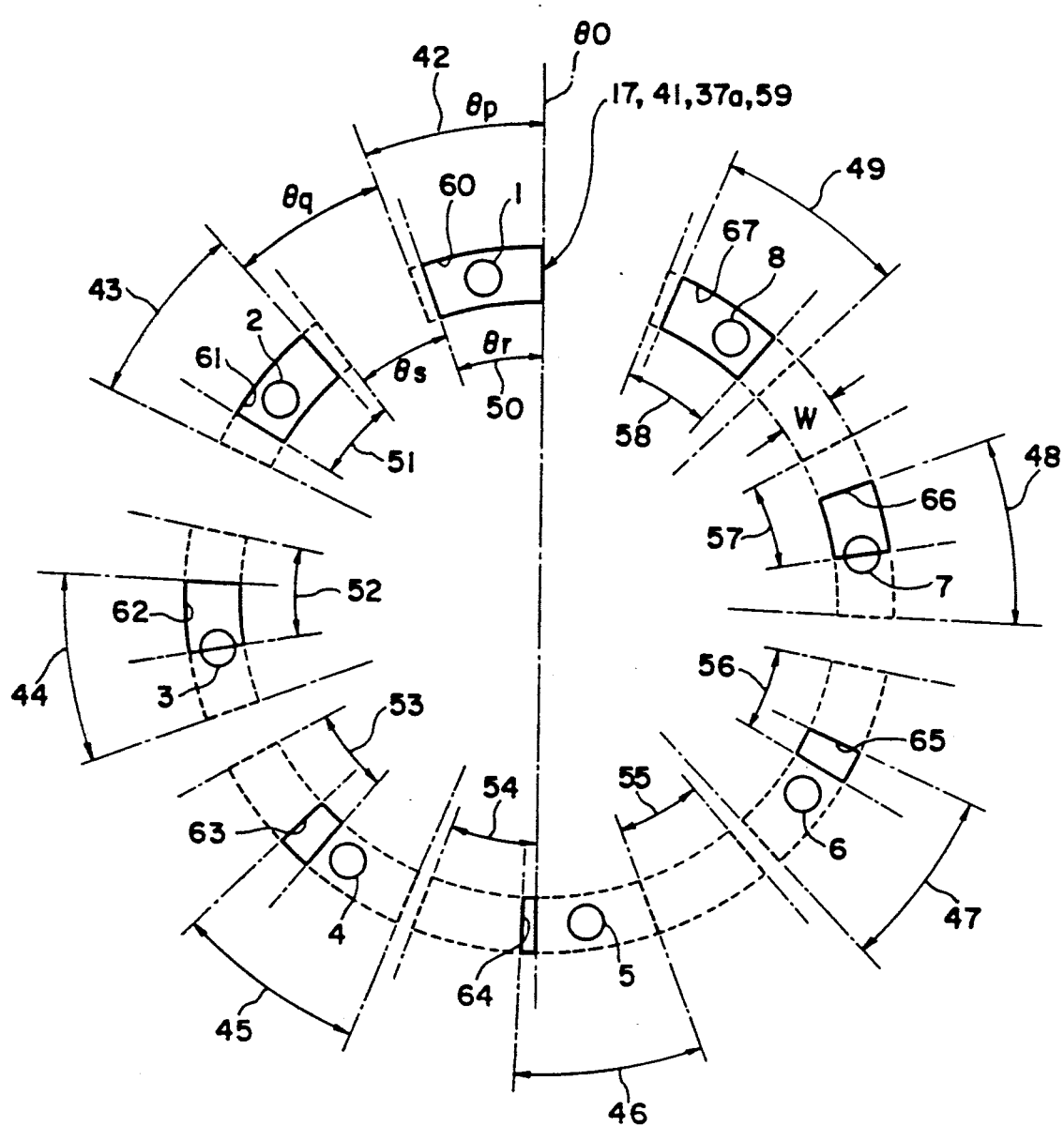

FIGS. 3 and 4 are an exemplary diagram of and a front view concretely illustrating the construction of the first and second slits, which are major members in the first embodiment of the torque transducer according to the present invention.

Referring to FIG. 3, 41 is a second slit part having a width W and provided on the the stator 38; 42 to 49 are eight stationary slits forming this second slit part 41, each having an opening area W×Lp, and disposed at equal intervals Lq between positions P0 and P8; 50 to 58 are nine rotating slits each having a similar width W and provided in the first slit part 37a of a rotor 37, each having an opening area W×Lr, and disposed at equal intervals Ls between positions P0 and P8; 59 is a relative opening part comprising the relative openings 60 to 67, which are formed by the stationary slits 42 to 49 and the rotational slits 50 to 58, respectively. The photosensors 1 to 8 are arranged in a one-to-one correspondence with the slits 42 to 49, respectively, and in the same positions. Accordingly, if the relative opening part 59 is regarded as a pulse signal waveform, the pulse widths of relative openings 60 to 67, when converted into amplitudes, correspond to the held energy signals (A1) to (A8), respectively. In this case, the position P8 is equal to P0, and in this example it is assumed that Lp=Lq and Lr=Ls.

As FIG. 4 exemplifies the construction in FIG. 3 as described above, the description will be given only for the relation or correspondence with in FIG. 3

Referring to FIG. 4, $\theta o$ corresponds to P0 and P8; $\theta p$ and $\theta q$ correspond to Lp and Lq, respectively; and $\theta r$ and $\theta s$ correspond to Lr and Ls, respectively. The positions (opening range) of the stationary slits 42 to 49 are shown as circular arc arrows on the outer periphery side of the slits 37a and 41 and the positions (opening range) of the rotating slits 50 to 58 are shown by arrows on the inner periphery, because the slits 37a and 41 overlaped each other in the drawing, and thus a simplified description is necessary. The photosensors 1 to 8 are disposed in positions corresponding to those of the stationary slits 42 to 48 in the circumferential direction of the opening positions, where the slits 41 are arranged in the radial direction.

As shown by the above relative opening part 59, regardless of the angular positional relationship between the rotor 37 and the stator 38, the respective opening areas of the relative openings 60 to 67 can be periodically changed in the circumferential direction.

Figure 5:
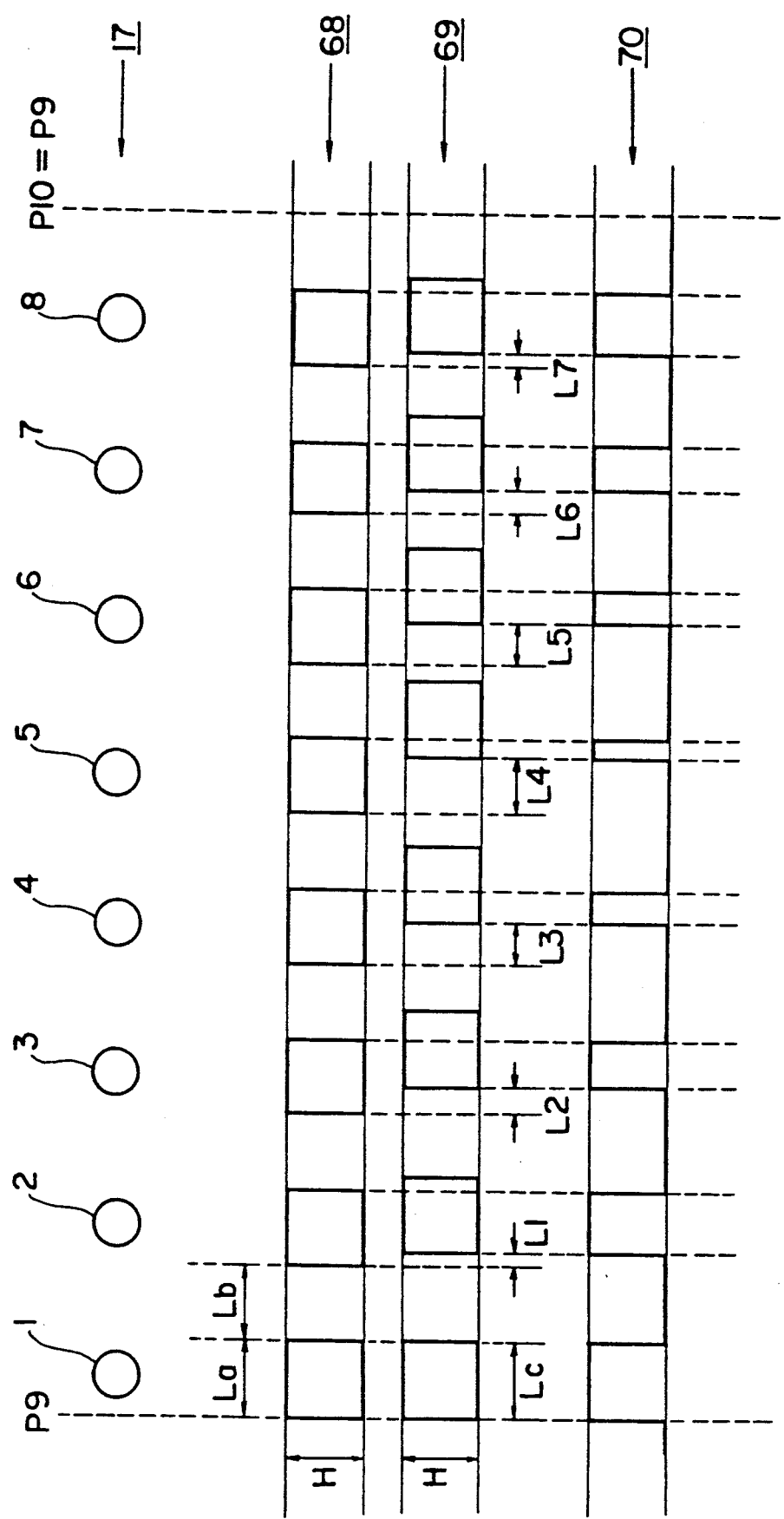
FIGS. 5 and 6 are typical diagram and a front view illustrating the construction of another embodiment of the present invention, respectively.
Figure 6:
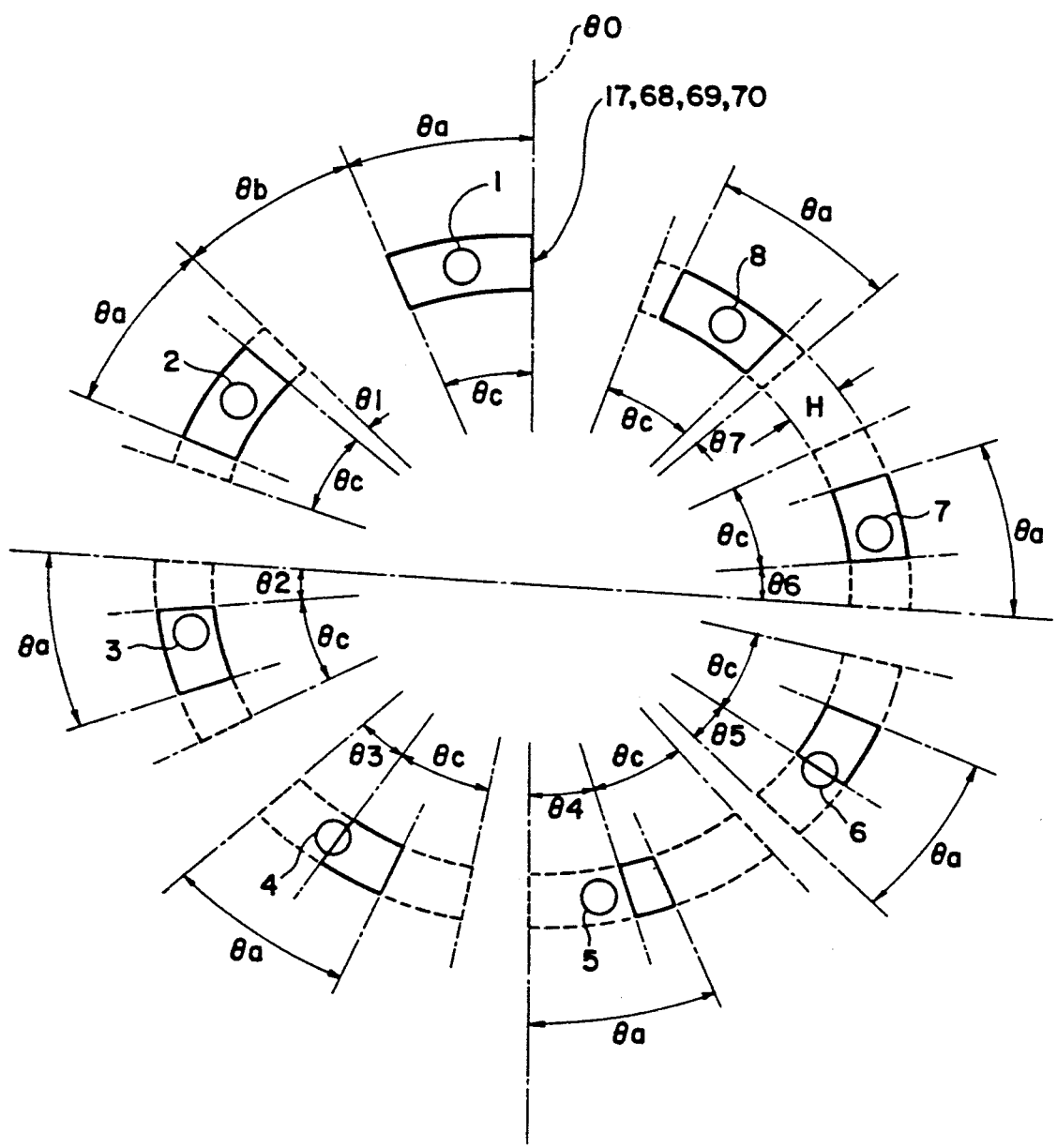

FIGS. 5 and 6 are, respectively an exemplary diagram of and a front view for concretely illustrating the construction of the second embodiment of the torque transducer according to the present invention.

Referring to FIG. 5, 68 is a second slit part having a width H and provided on a stator 38, and comprises eight stationary slits each having an opening area H×La and disposed at equal intervals Lb between positions P9 and P10; 69 is a first slit part having a width H and provided on the slit part 37a of a rotor 37, wherein eight rotating slits having an opening area H×Lc are disposed in such a way that they are shifted by the intervals L1, L2, L3, L4, L5, L6 and L7 (L1=L7<L2=L6<L3=L5<L4) from the above-mentioned respective stationary slits, respectively; 70 is a relative opening part formed by the respective slits of the above-mentioned slit parts 68 and 69. The photosensors 1 to 8 are arranged in positions corresponding to those of the respective stationary slits of the slit part 68, in a one-to-one relationship, and in this case, it is assumed that La=Lb=Lc and P9=P10.

Referring to FIG. 6, $\theta O$ corresponds to P9 and P10; $\theta a$ and $\theta b$ correspond to La and Lb, respectively; $\theta C$ corresponds to Lc; and $\theta 1$ to $\theta 7$ correspond to L1 to L7, respectively. Accordingly, $\theta a = \theta b = \theta c$ is satisfied, and $\theta 1 = \theta 7$, $\theta 2 = \theta 6$ and $\theta 3 = \theta 5$ ($\theta 1 < \theta 2 < \theta 3 < \theta 4$) are also satisfied.

Also, in this embodiment, the opening area of the respective relative openings of the relative opening part 70 can be periodically changed in the circumferential direction, as in the previous embodiment, and thus more detailed explanation thereof is omitted.

Further, in the embodiments of the torque transducer as described above, the construction on the load shaft 35 side is similar to that on the drive shaft 34 side.

Figure 7:
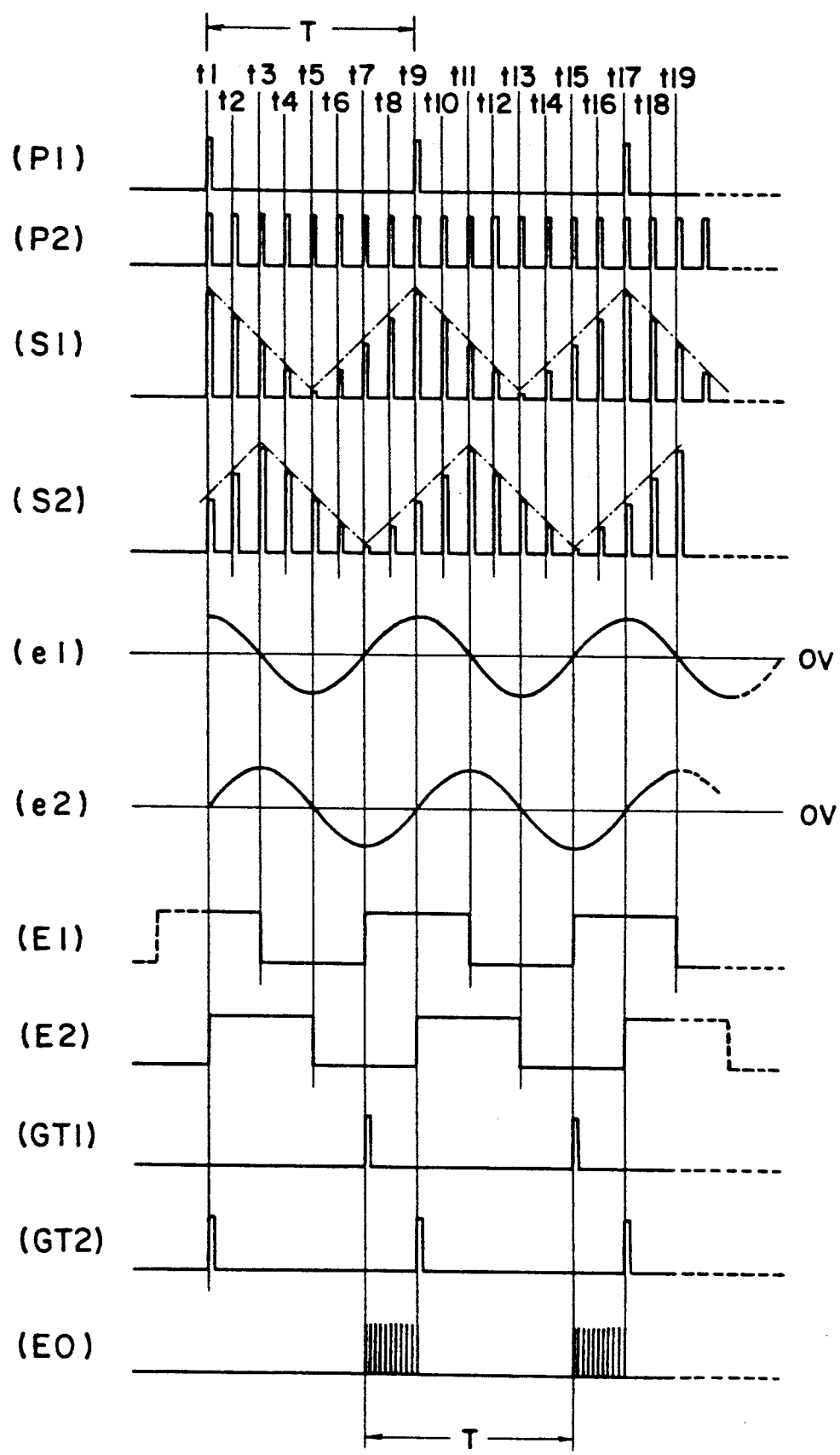
FIG. 7 is a timing chart explaining the operation of the embodiment shown in FIG. 1.
Figure 8:
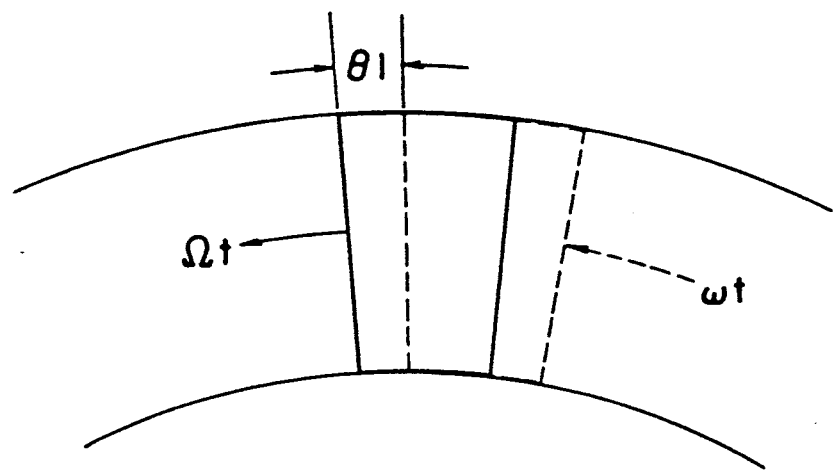
FIGS. 8 and 9 are schematic diagrams explaining the basic principle forming the basis of the present invention; and, FIG. 10 is a side view, partially in section, illustrating the prior art.
Figure 9:
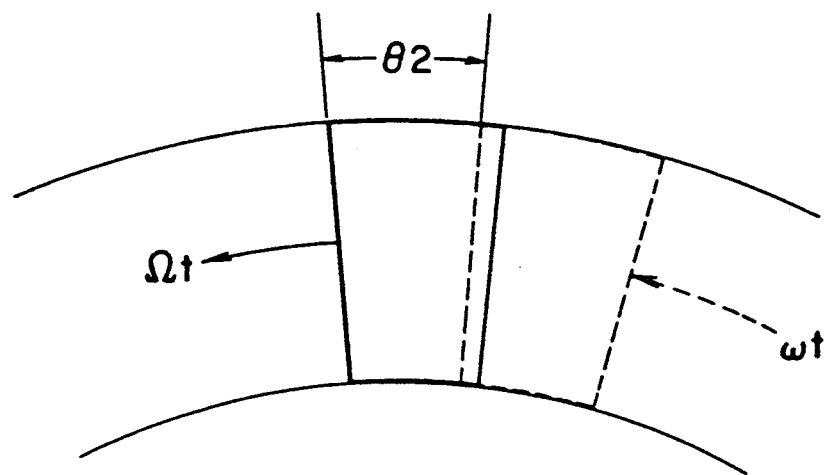
Figure 10:
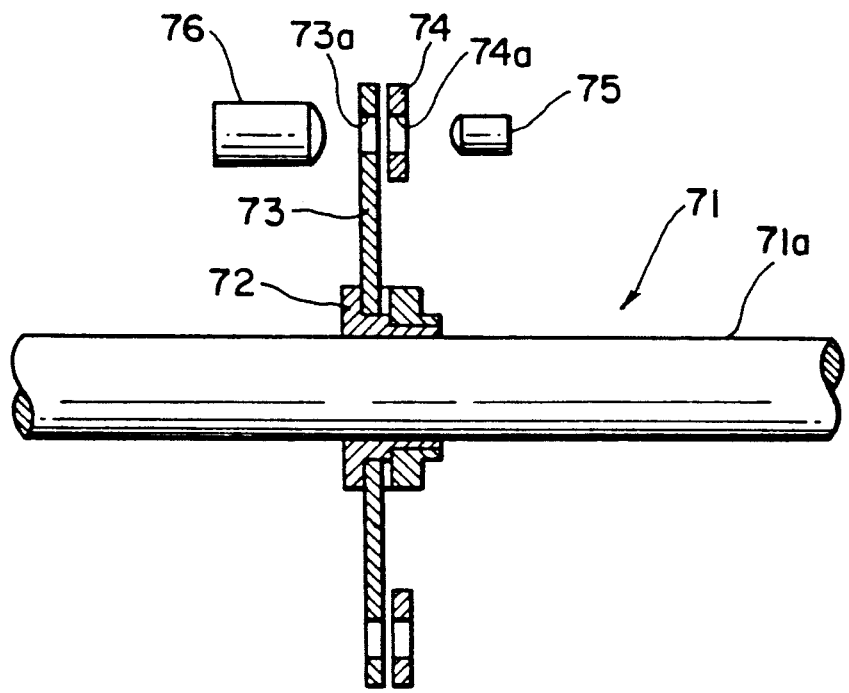

FIG. 7 is a timing chart illustrating the operation of the embodiment shown in FIG. 1, and FIGS. 8 and 9 are schematic diagrams showing the basic principle of the present invention.

In FIGS. 8 and 9, $\Omega$ is an angular velocity of the switching speed (sampling speed) between the MPX's 19 and 22 shown in FIG. 1; $\omega$ is a rotational velocity of the rotating speed of the rotor; $\theta 1$ is an initial phase difference between the rotor 37 and the stator 38 on the drive side 34; $\theta 2$ is an initial phase difference between the rotor 39 and the stator 40 on the load side 35; and t is a time. The units $\Omega$, $\omega$, $\theta 1$, and $\theta 2$ are all radian. Further, a relationship of $\Omega = 2\pi \Phi$ exists wherein T is a sampling period from t1 to t9 in FIG. 7 and $1/T = \Phi$, and further $\omega = 2\pi f$ wherein f is the rotational frequency of the rotor.

The operation of the above embodiment is described hereunder, and first, the relationship between the respective torque transducers and the opening signal group generation unit 17 will be described, followed by a description of the operation of the embodiment shown in FIG. 1.

In the torque transducer shown in FIGS. 4 and 6, when the rotor 37 is rotated, i.e., the rotary slits 50 to 58 of the slit parts 37a and 69 (corresponding to arrows marked $\theta c$) are rotated in the counterclockwise direction, from the aspect of the change in the output of one photosensor (for example, a photosensor 1), a relative opening part 59 and 70 are considered a pulse waveform, wherein abscissa denotes units of time, and thus periodic signals (waveforms) repeatedly, and periodically reduced and increased are obtained, respectively. An output wave form group wherein the above periodic signal is sequentially delayed by a predetermined time is obtained by respective photosensors 2 to 8, and the output of the photosensor 8 is delayed by about one cycle relative to the output of the photosensor 1.

Namely, the opening signal group is composed of outputs from the photosensors 1 to 8, respectively.

When the rotor 37 is stopped at the angle as shown in FIGS. 4 and 6, the outputs corresponding to the relative openings 60 to 67 are obtained from the respective photosensors 1 to 8, as described above. Namely, a periodic signal (waveform) is obtained in such a way that the output is maximum at a photosensor 1 (more precisely at phototransistor 9), the output is sequentially decreased and is at a minimum at the photosensor 5, and is sequentially increased again from the photosensor 6 so that the output of the photosensor 8 is equal to that of the photosensor 2. The periodic waveform is arranged (described hereinafter) on a time axis, whereby a time series signal corresponding to the above opening signal group is obtained. The periodicity of the periodic waveform is maintained regardless of the stopping position (angle to the stator 38) of the rotor 37.

It is assumed, as shown in FIG. 2, that the drive shaft 34, torque detector shaft 36, and load shaft 35 are rotated together in the direction of the arrow and that a torsion exists at the torque detector shaft 36; the positional relationship between the slits of the stator 38 and rotor 37 of the drive shaft 34 side is shown in FIGS. 4 and 6, for the respective torque transducers, and the positional relationship between the slits of the rotor 39 and stator 40 on the load shaft 35 side is such that the phase of the rotor 39 is delayed by the amount of the above torsion (small rotational angle), in comparision with that of the rotor 37.

Namely, for convenience, it may be considered in FIGS. 3 and 4 that the photosensors 1 and 2 correspond to the relative openings 66 and 67 and the photosensors 3 to 8 correspond to the relative openings 60 to 65, respectively, and this state is the same in FIGS. 5 and 6. Hereinafter the above state is referred to as the "delayed positional relationship".

The following is a description of the operation of the torque transducer exemplified in FIGS. 3 and 4.

It is assumed that, when the held pulse (P1) is supplied to the sample hold parts 18 and 21, the times t1, t9 and t17 are not related to the rotations of the rotors 37 and 39. Nevertheless, to simplify the description, when the slits of the rotor 37 and stator 38 are in the relationship as shown in FIG. 4, the first held pulse (P1) is output at the time t1. Accordingly, as described above, among the energy signals output from the phototransistors 9 to 16, the signal output from the photoresistor 9 is at a maximum and is sequentially decreased and the signal output from the photoresistor 13 is at a minimum and is sequentially increased from the photoresistor 14. The sample hold circuits SH1 to SH8 hold the above signals at t1, and output those signals as the held energy signals (A1) to (A8). The timing generator 33 sequentially outputs eight sampling pulses (P2) from the time t1 to the time t8 during the sampling period T of from the time t1 to the time t9. The MPX 19 receives the eight sampling pulses (P2) and outputs the sample signal (S1) during a cycle from the time t1 to the time t8, as shown in FIG. 7. Namely, the sample signal (S1) at the time t1 in FIG. 7 is at a maximum amplitude and the amplitude of the sample signal (S1) from the time t2 to the time t5 is sequentially decreased and then the amplitude of the sample signal (S1) is increased from the time t6 to the time t8.

The sample signal (S2) from the load shaft 35 side is also output from the MPX'22 through the second signal generating part 20 and sample hold part 21. Namely, as shown in FIG. 7, although the sample signal (S2) is produced in the same manner as the sample signal (S1), it is different from the sample signal (S1) in that the sample signal (S2) is delayed in proportion to the amount of torsion (corresponding to the torque) at the torque detector shaft 36, is increased from the time t1 to be at a maximum at the time t3, is reduced to be at a minimum at the time t7, and again increased from the time t8.

These sample signals (S1) and (S2) are interpolated through the LPF's 23 and 24, respectively, to eliminate the direct current component, and are output as interpolation signals (e1), (e2) having a smooth sine wave. To separate the phase components from the interpolation signals (e1), (e2) first the CMP's 25, 26 output an H level phase signal (E1) when the interpolation signals (e1) and (e2) exceed OV and an L level phase signal (E2) when the signals (e1) and (e2) do not exceed OV. Namely, with respect to the exemplary interpolation signal (e1), the phase signal (E1), which is L level at the time t3, H level at the time t7 and L level again at the time t11, is output. The positive differential circuits 28, 29 detect the rising edges of the above phase signals (E1), (E2) at the time t7 and the time t1 and t9, to output trigger signals (GT1), (GT2), and a counter 30 starts to count from the time t7 to receive the trigger signal (GT1) and output a count pulse (E0), and stops the count at the time t9 to receive the trigger signal (GT2), to thus obtain a relative phase difference between the sample signals (S1), (S2). The torque amount conversion circuit 31 receives the counted pulses (E0) and converts the number of counted pulses (E0) corresponding to the above phase difference into a torque amount and outputs the converted torque amount as a display signal (DSP) whereby the torque amount is displayed at a display 32.

Altough the above description does not mention the rotation or non-rotation of the rotors 39, 37, but the situation is identical in both cases. Namely, at a non-rotation state the positional relationship between the slits of the rotor 37 and stator 38 on the drive shaft 34 side is as shown in FIG. 4, and the positional relationship for the "delayed positional relationship" between the slits of the rotor 39 and stator 40 on the load shaft 35 side is as described above. Within the time the torsion of a torque detector shaft 36 is not changed, the state shown in FIG. 4 and the "delayed positional relationship" state are maintained. Namely, during rotation of rotors 39, 37, only the instantaneous state shown in FIG. 4 appears, and the "delayed positional relationship" state appears at a predetermined cycle, but since the sample hold parts 18, 21 hold the instantaneous state at the time t1 by a hold pulse (P1) repeated more frequently than the rotational angular velocity of the rotor, no effect is caused by the rotation of the rotors 39, 37. Accordingly, it is possible to measure the torque regardless of the rotation or non-rotation of the rotors 39, 37.

Next, a quantitative description will be given with reference to FIGS. 8 and 9. Two variables including the sampling pulse (P2) and the rotational speed of the rotors 37, 39 are arranged to correspond to a carrier wave and modulated wave, respectively, i.e., to correspond to a phase modulation, and thus the interpolation signals (e1), (e2) are expressed by the following equations (1) and (2), wherein K1 and K2 are proportional constants.

$$e1 = k1 \times \cos\{\Omega t + \theta 1 \times \cos \omega t\} \tag{1}$$

$$e2 = k2 \times \cos\{\Omega t + \theta 2 \times \cos \omega t\} \tag{2}$$

In the following description, the proportional constants K1 and K2 are omitted. In a non-rotation state of the rotors 37, 39, $\omega = 0$ is satisfied, and thus the equations (1) and (2) are replaced by the following equations (3) and (4).

$$e1 = \cos(\Omega t + \theta 1) \tag{3}$$

$$e2 = \cos(\Omega t + \theta 2) \tag{4}$$

Here, assuming $Ed = e1 - e2$ $$Ed = \sqrt{(\cos\theta 1 - \cos\theta 2)^2 + (\sin\theta 1 - \sin\theta 2)^2} \times \cos(\Omega t + \alpha) \tag{5}$$

and $$\alpha = \tan^{-1}\{(\sin\theta 2 - \sin\theta 1)/(\cos\theta 1 - \cos\theta 2)\} \tag{6}$$

In addition, $\theta 1, \theta 2 < 1$, $\cos \theta \approx \theta$, $\sin \theta \approx \theta$ may be adopted as approximations, and therefore the equation (5) is expressed as the equation (7).

$$Ed = \sqrt{2} (\theta 1 - \theta 2) \times \cos(\Omega t + \alpha) \tag{7}$$

Namely, from the initial phase $\theta 1$ of the rotor 37 and stator 38 on the drive shaft 34 side, and the initial position $\theta 2$ of the rotor 39 and 40 on the load shaft 35 side, $(\theta 1 - \theta 2)$ shown in the first term of the equation (7) is obtained as the relative phase difference. The second term $\cos(\Omega + \alpha)$ indicates that the above relative phase difference $(\theta 1 - \theta 2)$ appears in a periodically repeated state in the same cycle as the sampling period T. Namely, referring to FIG. 7, the count pulse (E0) corresponds to the above Ed.

Next, a description is given of the rotors 37, 39 when in a rotation state. Since $\omega \neq 0$ is mandatory in this case, the equations (1) and (2) are developed in the form of a Bessel function, as follows.

$$e1 \approx \cos \Omega t + (\theta 1/2) \cos\{(\Omega + \omega)t + (\pi/2)\} + (\theta 1/2)\cos\{(\Omega - \omega)t + (\pi/2)\} \tag{8}$$

$$e2 \approx \cos \Omega t + (\theta 2/2) \cos\{(\Omega + \omega)t + (\pi/2)\} + (\theta 2/2)\cos\{(\Omega - \omega)t + (\pi/2)\} \tag{9}$$

By a relationship, $Ed = e1 - e2$, $$Ed = -\{(\theta 1 - \theta 2)/2\}\{\sin(\Omega + \omega)t + \sin(\Omega - \omega)t\} \tag{10}$$

Here, assuming $\Omega \gg \omega$, $$Ed = -(\theta 1 - \theta 2) \sin \Omega t$$

can be obtained.

That is, in the same manner as in the non-rotation state, the relative phase difference ($\theta 1 - \theta 2$) appears repeatedly at the sampling period T.

Namely, according to the present invention, the rotor 37 and stator 38 are provided on the drive shaft 34, and the rotor 39 and stator 40 are provided on the load shaft 35, respectively, and slit parts 37a, 40a and slit parts 69, 68 or slit parts 74, 71 are provided on the rotors 37, 39 and stators 38, 40, respectively. As shown by the relative openings 69, 70, the opening amount of the relative openings 60 to 67 are periodically changed in the circumferential direction, and by using a torque transducer to obtain an opening signal group corresponding to the above opening amount, the respective opening signal groups are detected as energy signals which are held in the sample hold parts 18, 21 and output by the MPX's 19, 22 as sample signals (S1), (S2), i.e., as time series analog signals. The relative phase difference between the rotors 37, 39 is obtained from the phase difference between the sample signals (S1), (S2) and thus the torque at the torque detector shaft 36 is measured. Accordingly, an advantage is obtained in that the torque can be measured regardless of the rotation or non-rotation of the rotors 37, 39.

Further, another advantage is obtained in that the construction is simplified because it is not necessary to rotate the stators 38, 40 when the rotors 37, 39 are stopped, as needed in the conventional operation.

Various modifications can be made to the above embodiments of the present invention without departing from the scope or principle thereof.

For example, as the photosensors 1 to 8, reflection type photosensors having phototransistors 9 to 16 on the same side as light emitting diodes 1a to 8a may be used, and thus the invention is not limited to the use of transmission type photosensors as described above, and in this case the slits may be replaced by reflection surfaces, having the same configuration.

Although disk type flat plates are used in the above embodiments as the drive side rotating member, load side rotating member, drive side stationary member, and load side stationary member, these can be formed as thin cylindrical bodies instead. When using such cylindrical bodies, the configuration of each slit, as shown in FIGS. 3 and 4, is formed in a rectangular shape by dividing a circular band having a predetermined width (smaller than that of the cylindrical body) into equal divisions at a predetermined angle, and providing a plurality of the above rectangular slits on the above cylindrical body at the predetermined anglular intervals. The relationship between each stationary slit and rotation slit may be set in the same manner as in the embodiments shown in FIGS. 4 and 6.

In the CMP's 25, 26, the reference voltage need not be limited to OV but may be any arbitrary voltage within a range not exceeding the maximum amplitude of the interpolation signals (e1), (e2).

Altough the slit parts 37a, 69 serving as the first slits and the slit parts 41, 68, serving as the second slits are provided on the rotor 37 (and 39) and the stator 38 (and 40), respectively, the second slits and the first slits may be provided on the rotor 37 and the stator 38, respectively.

Further, the number of respective stationary slits 42 to 49 of the slit parts 41, 68 is given as eight to simplify description, but the number of slits need not be limited to eight but may be increased or decreased by taking the torsion angle of the torque transmission shaft twisted by the torque load into account; for example, if the torsion angle is 3°, 120 slits can provide the required resolution. In the torque transducer in the first embodiment shown in FIGS. 3 and 4, the difference in the number of the slits in the slit part 37 on the rotating side and in the slit part 41 on the stationary side, is that by which the opening signal group in one cycle is obtained by one sampling, but this may be changed in such a way that the opening signal group is obtained in two cycles. Also, the widths W of the slits 41, 37a need not be equal, and the widths H of the slit parts 68, 69 also need not be the same.

In the torque transducer in FIGS. 4, 6, when the number of stationary slits 42 to 49 and rotating slits 50 to 58 must be increased to several hundred, the photosensors 1 to 8 can not always be positioned in a one-to-one correspondence with the stationary slits 42 to 49. In this case, eight photosensors may be used as long as uniform distribution is maintained without deterioration of the measurement accuracy. In this case, one photosensor receives light from a plurality of slits, but the light amount is equalized by making the size of the photosensor such that the measurement accuracy is not lowered.

What is claimed is:

1. A torque transducer, comprising:
    a drive side rotating member and a load side rotating member mounted on the drive side and the load side respectively and each being formed as a plate with a flat surface provided with first slits each having a similar shape,
    a drive side stationary member and a load side stationary member fixedly mounted on a stationary part adjacent to said drive side rotating member and load side rotating member and formed as a plate with a flat surface provided with second slits each having a similar shape, and
    a drive side opening amount detector and a load side opening amount detector for detecting a relative amount of opening formed by said first slit and second slit on said drive side and a relative amount of opening formed by said first slit and said second slit on said load side, respectively, and for converting these opening amounts into electric signals, to thereby detect a torque transmitted to a torque transmission shaft by detecting a relative phase difference between said both rotating members based on periodic changes in the outputs received from said both opening amount detectors,
    wherein one of said first and second slits has a sector shape or rectangular shape formed by dividing a space between two spaced concentric circles each having different radii to provide a space between circular bands to form one dimension of said sector or rectangular shape and each having a predetermined width for dividing said last-mentioned space into equal divisions at predetermined angular intervals, and a plurality of the sector slits or rectangular slits are formed on said flat surface at said predetermined angular intervals and the other of said first and second slits has a sector shape or rectangular shape each having a predetermined width of equal divisions at an interval of an angle different from the predetermined angular intervals, each being formed by dividing the space between two concentric circles each having a different radii to provide a space between circular bands with the lastmentioned predetermined width to form the equal divisions, and a plurality of the sector slits or rectangular slits are formed on said flat surface at equal intervals having an angle different from said predetermined angular intervals, and further, a plurality of said drive side opening amount detectors and load side opening amount detectors are arranged in the circumferential direction at equiangular intervals and facing said second slits formed in the stationary members at said drive side and at said load side, to obtain a periodic change of said relative opening amount formed at an arbitrary time by corresponding first slits and second slits on the drive side, and corresponding first slits and second slits on the load side, respectively, and said relative opening amount is repeatedly and periodically gradually increased and decreased in the circumferential direction over at least one cycle.

2. A torque transducer comprising:
a drive side rotating member and a load side rotating member mounted on the drive side and load side respectively and each being provided with a plurality of first slits having a similar shape;
a drive side stationary member and a load side stationary member fixedly mounted on a stationary part adjacent to said drive side rotating member and load side rotating member, respectively, and each being provided with a plurality of second slits having a similar shape, and the shape of said second slits being different from the shape of said first slits;
a drive side opening amount detector and a load side opening amount detector for detecting a relative amount of opening formed by a first slit and a second slit on said drive side and a relative amount of opening formed by a first slit and a second slit on said load side, respectively, and for converting these relative opening amounts into electric signals, to thereby detect a torque transmitted to a torque transmission shaft by detecting a relative phase difference between said both rotating members based on periodic changes in the outputs received from said both opening amount detectors;
a plurality of said drive side opening amount detectors and a plurality of said load side opening amount detectors being arranged in a circumferential direction at equiangular intervals and facing said second slits formed in said stationary members at said drive side and at said load side, to obtain a periodic change of said relative opening amount formed at an arbitrary time by said first slits and said second slits on the drive side, and said first slits and said second slits on said load side, respectively, and said relative opening amount being repeatedly and periodically gradually increased and decreased in the circumferential direction over at least one cycle.

3. The torque transducer according to claim 2, wherein said rotating and said stationary members are circularly shaped and one of said first and said second slits is formed into a sector shape obtained by dividing the space between two concentric circles having different radii, into equal spaced divisions at predetermined angular intervals forming sides orthogonal to sid concentric circles and defining therebetween and between said concentric circles, said sector shape between two portions of radii each, and a plurality of the sector slits being formed at said predetermined angular intervals, and further, the other of said first and said second slits being similarly formed into a sector shape, and a plurality of the sector slits being formed at irregular angular intervals in such a way that the amount of deviation of said plural slits on one side is sequentially increased or decreased over at least one cycle.

4. The torque transducer according to claim 2, wherein said members are all circularly-shaped and one of said first and said second slits has a substantially rectangular shape formed by dividing a space between two concentric circles having different radii.

5. The torque transducer according to claim 2, wherein each said rotating member and each said stationary member is formed as a flat plate provided with said first and said second slits.

6. The torque transducer according to claim 5, wherein one of said first and said second slits has a rectangular shape formed by dividing a space formed between circular bands in a radial direction having a predetermined width transverse to said radial direction along said circular bands into equal divisions at predetermined angular intervals, and a plurality of the rectangular slits are formed on said flat plate rotating members at said predetermined angular intervals and the other of said first and said second slits has a rectangular shape formed by dividing the space between the circular bands with a predetermined width into equal divisions at an interval of an angle different from said predetermined angular intervals, and a plurality of the rectangular slits are formed on said flat plate stationary members at equal intervals having an angle different from said predetermined angular intervals, and the quantity of said slits on said rotating members being different from the quantity of slits on said stationary members.

7. The torque transducer according to claim 5, wherein one of said first and said second slits has a rectangular shape formed by dividing a space between two concentric circles having different radii into equal divisions at predetermined angular intervals, and a plurality of the rectangular slits are formed on said flat plate rotating members at said predetermined angular intervals and the other of said first and said second slits has a rectangular shape formed by dividing the space between two concentric circles having different radii into equal divisions at an interval of an angle different from said predetermined angular intervals, and a plurality of the rectangular slits are formed on said flat plate stationary members at equal intervals having an angle different from said predetermined angular intervals, and the quantity of said slits on said rotating members and said stationary members being equal.

8. The torque transducer according to claim 2, wherein one of said first and said second slits has a sector shape formed by dividing a space between two concentric circles having different radii into equal divisions at predetermined angular intervals, and a plurality of the sector slits formed on said rotating members at said predetermined angular intervals have a similar width and the other of said first and said second slits has a sector shape formed by dividing the space between two concentric circles having different radii, at an interval of an angle different from said predetermined angular intervals, and a plurality of the sector slits formed on said stationary members at equal intervals have an angle different from said predetermined angular intervals.

9. The torque transducer according to claim 2, wherein one of said first and said second slits is formed by dividing a space between circular bands in a radial direction thereof having a predetermined width in a direction transverse to the radial direction and said circular bands into equal divisions at predetermined angular intervals, and a plurality of rectangular slits are formed on said rotating members at said predetermined angular intervals and the other of said first and said second slits has a sector shape formed by dividing the space between circular bands in a radial direction thereof with a predetermined width transverse to the radial direction into equal divisions at an interval of an angle different from said predetermined angular intervals, and a plurality of the sector slits are formed on said stationary members and disposed at equal intervals having an angle different from said predetermined angular intervals.

10. The torque transducer according to claim 2, wherein one of the first and second slits is formed into a rectangular shape obtained by dividing a space between radially spaced circular bands with two sides of said rectangular shape being formed by parts of said circular bands and with two other sides formed by radii having a predetermined width between two radii, into equal divisions at predetermined angular intervals, and a plurality of the rectangular slits being formed at said predetermined angular intervals, and further, the other of said first and said second slits being formed into a rectangular shape, and a plurality of the slits are formed at irregular angular intervals in such a way that the amount of deviation of said plural slits on one side is sequentially increased or decreased over at least one cycle.

11. The torque transducer according to claim 2, wherein one of the first and second slits is formed into a sector shape obtained by dividing a space between circular bands with two sides of said shape being formed by parts of said circular bands with two other sides orthogonal to said circular bands formed by radii having a predetermined width, into equal divisions at predetermined angular intervals, and a plurality of the slits being formed at said predetermined angular intervals, and further, the other of said first and said second slits being formed into a sector shape, and a plurality of the sector slits are formed at irregular angular intervals in such a way that the amount of deviation of said plural slits on one side is sequentially increased or decreased over at least one cycle.

12. The torque transducer according to claim 2, wherein one of said first and said second slits is formed into a rectangular shape by dividing the space between two concentric circles having different radii, into equal divisions spaced at predetermined angular intervals, and a plurality of the rectangular slits being formed at said predetermined angular intervals, and further, the other of said first and said second slits being similarly formed into a rectangular shape, and a plurality of the rectangular slits being formed at irregular angular intervals in such a way that the amount of deviation of said plural slits on one side is sequentially increased or decreased over at least one cycle.

13. The torque measuring device including the torque transducer of claim 2 for detecting a change in a relative opening amount formed by respective slits of said drive side rotating member and said load side rotating member mounted on the drive side and load side of said torque transmission shaft, respectively, and respective slits of said drive side stationary member and said load side stationary member being fixedly mounted to a stationary part adjacent to said rotating member on said drive side and on said load side, respectively, by a plurality of drive side opening amount detectors and load side opening amount detectors, comparing phases of the periodic signals output from said opening amount detectors, and measuring a torque at said transmission shaft based on said phase difference, comprising:

first and second opening group signal units forming part of said torque transducer and including a plurality of said drive side opening amount detectors and load side opening amount detectors, which are arranged at predetermined positions and facing said second slits formed in the stationary member at said drive side and at said load side, to obtain a periodic change of said relative opening amount formed at an arbitrary time by said first slit and said second slit on the drive side, and said first slit and said second slit on the load side, respectively, for obtaining an opening signal group of the periodic signal corresponding to at least one cycle;

two pairs of memory circuits for simultaneously receiving two opening signal groups, one by one, from said first and second opening signal group generating units respectively, and temporarily memorizing the signal groups received;

two signal switching circuits for receiving two pairs of memory outputs, one pair by one pair, from said two pairs of memory circuits and sequentially switching one of the plurality of memory outputs in a predetermined order and at predetermined intervals;

two interpolation circuits for receiving sampling outputs from said two signal switching circuits respectively and interpolating and smoothing said sampled outputs as analog signals received in time series;

a phase comparison circuit for receiving the outputs from said two interpolation circuits and detecting and outputting the phase difference between the two signals; and a torque amount conversion circuit for receiving the output from said phase comparison circuit and converting the phase difference into a torque, to enable a torque at an arbitrary time to be measured even when at least one of said drive side rotating member and said load side rotating member is in a nonrotating state.

14. The torque transducer according to claim 1, wherein a plurality of the sector slits or rectangular slits are rotating slits and are formed on said flat plate surface of said rotating members at irregular angular intervals in such a way that the amount of deviation of said slits on one side is sequentially increased or decreased over at least one cycle.

15. A torque measuring device for detecting a change in a relative opening amount formed by respective first slits on a drive side rotating member mounted on a drive side of a torque transmission shaft and a load side rotating member mounted on a load side of said torque transmission shaft, and respective second slits on a drive side stationary member adjacent to said drive side rotating member and a load side stationary member adjacent to said load side rotating member, each of said stationary members being fixedly mounted to a stationary part adjacent to a respective one of said rotating members on said drive side and said load side, respectively, by a plurality of drive side opening amount detectors and load side opening amount detectors for comparing phases of the periodic signals output from said opening amount detectors and for measuring a torque at said transmission shaft based on said phase difference, comprising:

a torque transducer having first and second opening signal group generating units including a plurality of said drive side opening amount detectors and load side opening amount detectors, which are arranged at predetermined positions and facing said second slits formed in the stationary members at said drive side and at said load side, to obtain a periodic change of said relative opening amount formed at an arbitrary time by said first slit and second slit on the drive side, and said first slit and second slit on the load side, respectively, for obtaining an opening signal group of the periodic signal corresponding to at least one cycle;

two pairs of memory circuits for simultaneously receiving two opening signal groups, one by one, from said first and second opening signal group generating units respectively, and temporarily memorizing the signal groups received;

two signal switching circuits for receiving two pairs of memory outputs, one pair by one pair, from said two pairs of memory circuits and sequentially switching one of the plurality of memory outputs in a predetermined order and at predetermined intervals;

two interpolation circuits for receiving sampling outputs from said two signal switching circuits respectively and interpolating and smoothing said sampled outputs as analog signals received in time series;

a phase comparison circuit for receiving the outputs from said two interpolation circuits and detecting and outputting the phase difference between the two signals; and a torque amount conversion circuit for receiving the output from said phase comparison circuit and converting the phase difference into a torque, to enable the torque at an arbitrary time to be measured even when one or both of said drive side rotating member and said load side rotating member are in a nonrotating state.

* * * * *